(12) United States Patent
Leak et al.

(10) Patent No.: US 7,568,214 B2
(45) Date of Patent: *Jul. 28, 2009

(54) PROVIDING MULTIPLE LEVELS OF INTERACTIVE TELEVISION SERVICE USING TRIGGERS AND TRIGGER FILTERS

(75) Inventors: Bruce A. Leak, Los Altos, CA (US); Daniel J. Zigmond, Menlo Park, CA (US); Dean J. Blackketter, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 818 days.

This patent is subject to a terminal disclaimer.

(21) Appl. No.: 10/893,518

(22) Filed: Jul. 16, 2004

(65) Prior Publication Data

US 2004/0261130 A1 Dec. 23, 2004

Related U.S. Application Data

(63) Continuation of application No. 09/467,851, filed on Dec. 20, 1999, now Pat. No. 7,174,562.

(51) Int. Cl.
*H04N 7/173* (2006.01)

(52) U.S. Cl. ............... 725/110; 725/135; 725/136; 725/112; 725/97

(58) Field of Classification Search ............ 725/112, 725/131, 135, 136, 139, 97, 110; 709/217, 709/218, 219; 707/9, 10
See application file for complete search history.

(56) References Cited

U.S. PATENT DOCUMENTS 4,894,789 A 1/1990 Yee (Continued)

FOREIGN PATENT DOCUMENTS

EP 0849946 6/1998

(Continued)

OTHER PUBLICATIONS

Advanced Television Enhancement Forum Specification (ATVEF), Feb. 2, 1999, Draft Version 1.1r26, pp. 1-37.*

(Continued)

*Primary Examiner*—John W. Miller
*Assistant Examiner*—John Schnurr
(74) *Attorney, Agent, or Firm*—Workman Nydegger

(57) ABSTRACT

An interactive television system includes "connected" receiver units capable of establishing bi-directional connections to remote information stores, such as Web servers, and "disconnected" receiver units unequipped to make such connections. The system supports the use of broadcast triggers that include connectivity values indicating whether an information resource identified by a trigger refers to "connected content" or "disconnected content." The term "connected content" refers to information resources that require bi-directional connections to remote information stores; the term "disconnected content" refers to information resources, such as a locally stored program guide, that do not require such bi-directional connections. Disconnected receiver units identify and reject connected-content triggers by examining connectivity values broadcast as part of triggers. Thus, content providers can broadcast connected-content triggers to connected and disconnected receiver units without interrupting disconnected receiver units with links to inaccessible content. Furthermore, the ability to distinguish between connected and disconnected content allows vendors who sell or lease receiver units to offer a lower level of service to those customers who do not wish to pay for the ability to access connected content.

20 Claims, 4 Drawing Sheets

U.S. PATENT DOCUMENTS

| | | | |
|---|---|---|---|
| 5,010,499 A | 4/1991 | Yee | |
| 5,025,837 A | 6/1991 | Gielen | |
| 5,091,877 A | 2/1992 | Itoh | |
| 5,121,476 A | 6/1992 | Yee | |
| 5,355,484 A | 10/1994 | Record | |
| 5,485,553 A | 1/1996 | Kovalick | |
| 5,508,731 A | 4/1996 | Kohorn | |
| 5,526,035 A | 6/1996 | Lappington | |
| 5,528,490 A | 6/1996 | Hill | |
| 5,539,822 A | 7/1996 | Lett | |
| 5,589,832 A | 12/1996 | Knee | |
| 5,600,632 A | 2/1997 | Schulman | |
| 5,617,526 A | 4/1997 | Oran | |
| 5,648,824 A | 7/1997 | Dunn | |
| 5,737,552 A | 4/1998 | Lavallee | |
| 5,752,159 A | 5/1998 | Faust | |
| 5,761,602 A | 6/1998 | Wagner | |
| 5,761,606 A | 6/1998 | Wolzien | |
| 5,771,354 A | 6/1998 | Crawford | |
| 5,774,664 A | 6/1998 | Hidary | |
| 5,774,666 A | 6/1998 | Portuesi | |
| 5,778,181 A | 7/1998 | Hidary | |
| 5,796,967 A | 8/1998 | Filepp | |
| 5,798,785 A | 8/1998 | Hendricks | |
| 5,801,747 A | 9/1998 | Bedard | |
| 5,818,441 A | 10/1998 | Throckmorton | |
| 5,818,935 A | 10/1998 | Maa | |
| 5,826,165 A | 10/1998 | Echeita | |
| 5,832,223 A | 11/1998 | Hara | |
| 5,835,712 A | 11/1998 | DuFresne | |
| 5,838,314 A | 11/1998 | Neel | |
| 5,844,620 A | 12/1998 | Coleman | |
| 5,845,260 A | 12/1998 | Nakano | |
| 5,848,352 A | 12/1998 | Dougherty | |
| 5,848,396 A | 12/1998 | Gerace | |
| 5,848,397 A | 12/1998 | Marsh | |
| 5,855,008 A | 12/1998 | Goldhaber | |
| 5,857,190 A | 1/1999 | Brown | |
| 5,861,881 A | 1/1999 | Freeman | |
| 5,862,220 A | 1/1999 | Perlman | |
| 5,864,823 A | 1/1999 | Levitan | |
| 5,867,208 A | 2/1999 | McLaren | |
| 5,889,950 A | 3/1999 | Kuzma | |
| 5,929,849 A | 7/1999 | Kikinis | |
| 5,929,850 A | 7/1999 | Broadwin | |
| 5,931,908 A | 8/1999 | Gerba | |
| 5,937,331 A | 8/1999 | Kalluri | |
| 5,940,073 A | 8/1999 | Klosterman | |
| 5,956,090 A | 9/1999 | Yamauchi | |
| 5,961,603 A | 10/1999 | Kunkel | |
| 5,978,828 A | 11/1999 | Greer | |
| 5,982,445 A | 11/1999 | Eyer | |
| 5,987,509 A | 11/1999 | Portuesi | |
| 5,991,596 A | 11/1999 | Cunningham | |
| 5,991,799 A | 11/1999 | Yen | |
| 6,002,394 A | 12/1999 | Schein | |
| 6,002,444 A | 12/1999 | Marshall | |
| 6,005,565 A | 12/1999 | Legall | |
| 6,006,256 A | 12/1999 | Zdepski et al. | |
| 6,006,265 A | 12/1999 | Rangan | |
| 6,008,836 A | 12/1999 | Bruke | |
| 6,009,410 A | 12/1999 | LeMole | |
| 6,011,537 A | 1/2000 | Slotznick | |
| 6,012,087 A | 1/2000 | Freivald | |
| 6,018,764 A | 1/2000 | Field | |
| 6,018,768 A * | 1/2000 | Ullman et al. | 709/218 |
| 6,021,426 A | 2/2000 | Douglis | |
| 6,023,698 A | 2/2000 | Lavey | |
| 6,026,435 A | 2/2000 | Enomoto | |
| 6,029,045 A | 2/2000 | Picco | |
| 6,029,193 A * | 2/2000 | Yamamoto et al. | 725/110 |
| 6,034,689 A | 3/2000 | White | |
| 6,049,831 A | 4/2000 | Gardell | |
| 6,055,564 A | 4/2000 | Phaal | |
| 6,057,872 A | 5/2000 | Candelore | |
| 6,058,430 A | 5/2000 | Kaplan | |
| 6,061,719 A | 5/2000 | Bendinelli | |
| 6,064,376 A | 5/2000 | Berezowski | |
| 6,064,440 A | 5/2000 | Born | |
| 6,075,568 A | 6/2000 | Matsuura | |
| 6,078,961 A | 6/2000 | Mourad | |
| 6,081,842 A | 6/2000 | Shachar | |
| 6,097,441 A | 8/2000 | Allport | |
| 6,134,379 A | 10/2000 | LaMacchia | |
| 6,141,678 A | 10/2000 | Britt | |
| 6,154,771 A | 11/2000 | Rangan | |
| 6,169,541 B1 | 1/2001 | Smith | |
| 6,172,673 B1 * | 1/2001 | Lehtinen et al. | 715/716 |
| 6,172,677 B1 | 1/2001 | Stautner | |
| 6,177,931 B1 | 1/2001 | Alexander | |
| 6,178,114 B1 | 1/2001 | Anderson | |
| 6,195,692 B1 | 2/2001 | Hsu | |
| 6,198,511 B1 | 3/2001 | Matz | |
| 6,199,206 B1 | 3/2001 | Nishioka | |
| 6,201,538 B1 | 3/2001 | Wugofski | |
| 6,215,483 B1 | 4/2001 | Zigmond | |
| 6,215,783 B1 | 4/2001 | Zigmond | |
| 6,229,532 B1 | 5/2001 | Fujii | |
| 6,229,541 B1 | 5/2001 | Kamen | |
| 6,240,555 B1 | 5/2001 | Shoff | |
| 6,243,741 B1 | 6/2001 | Utsumi | |
| 6,253,228 B1 | 6/2001 | Ferris | |
| 6,256,785 B1 | 7/2001 | Klappert | |
| 6,260,192 B1 | 7/2001 | Rosin | |
| 6,263,505 B1 | 7/2001 | Walker | |
| 6,285,407 B1 | 9/2001 | Yasuki | |
| 6,295,647 B1 * | 9/2001 | Ramaswamy | 725/116 |
| 6,314,569 B1 | 11/2001 | Chernock | |
| 6,317,780 B1 | 11/2001 | Cohn | |
| 6,317,885 B1 | 11/2001 | Fries | |
| 6,335,736 B1 | 1/2002 | Wagner | |
| 6,348,932 B1 | 2/2002 | Nishikawa | |
| 6,351,270 B1 | 2/2002 | Nishikawa | |
| 6,357,042 B2 | 3/2002 | Srinivasan | |
| 6,367,080 B1 | 4/2002 | Enomoto | |
| 6,373,503 B1 | 4/2002 | Perkes | |
| 6,374,404 B1 | 4/2002 | Brotz | |
| 6,400,407 B1 | 6/2002 | Zigmond | |
| 6,412,111 B1 | 6/2002 | Cato | |
| 6,415,438 B1 | 7/2002 | Blackketter | |
| 6,446,261 B1 | 9/2002 | Rosser | |
| 6,460,180 B1 | 10/2002 | Park | |
| 6,473,903 B2 | 10/2002 | Balakrishnan | |
| 6,502,243 B1 | 12/2002 | Gomer | |
| 6,510,557 B1 | 1/2003 | Thrift | |
| 6,512,551 B1 | 1/2003 | Lund | |
| 6,512,558 B2 | 1/2003 | Linuma | |
| 6,522,342 B1 | 2/2003 | Gagnon | |
| 6,530,082 B1 | 3/2003 | Del Sesto | |
| 6,560,777 B2 | 5/2003 | Blackketter | |
| 6,564,379 B1 | 5/2003 | Knudson | |
| 6,571,392 B1 | 5/2003 | Leak | |
| 6,584,153 B1 | 6/2003 | Comito et al. | |
| 6,600,496 B1 | 7/2003 | Wagner | |
| 6,604,239 B1 | 8/2003 | Kohen | |
| 6,604,242 B1 | 8/2003 | Weinstein | |
| 6,615,408 B1 | 9/2003 | Kaiser | |
| 6,662,007 B2 | 12/2003 | Yuen | |
| 6,668,378 B2 | 12/2003 | Leak | |
| 6,681,393 B1 | 1/2004 | Bauminger | |
| 6,698,020 B1 | 2/2004 | Zigmond | |
| 6,725,461 B1 | 4/2004 | Dougherty | |
| 6,751,800 B1 | 6/2004 | Fukuda | |
| 6,754,905 B2 | 6/2004 | Gordon | |

| | | | |
|---|---|---|---|
| 6,766,524 | B1 | 7/2004 | Matheny |
| 6,785,902 | B1 | 8/2004 | Zigmond |
| 6,874,161 | B1 * | 3/2005 | Wasserman et al. ........... 725/95 |
| 6,886,178 | B1 | 4/2005 | Mao |
| 6,912,726 | B1 | 6/2005 | Chen |
| 6,928,652 | B1 | 8/2005 | Goldman |
| 6,938,270 | B2 | 8/2005 | Blackketter |
| 6,990,676 | B1 | 1/2006 | Proehl |
| 6,990,678 | B2 | 1/2006 | Zigmond |
| 7,103,904 | B1 | 9/2006 | Blackketter |
| 7,165,266 | B2 | 1/2007 | Zigmond |
| 7,174,562 | B1 | 2/2007 | Leak |
| 7,181,756 | B1 | 2/2007 | Zigmond |
| 7,296,282 | B1 | 11/2007 | Koplar |
| 2001/0001160 | A1 | 5/2001 | Shoff |
| 2002/0007493 | A1 | 1/2002 | Butler |
| 2002/0010926 | A1 | 1/2002 | Lee |
| 2002/0053077 | A1 | 5/2002 | Shah-Nazaroff |
| 2002/0133816 | A1 | 9/2002 | Greene |
| 2003/0005463 | A1 | 1/2003 | Macrae |
| 2004/0040042 | A1 | 2/2004 | Feinleib |
| 2004/0205810 | A1 | 10/2004 | Matheny |
| 2005/0028206 | A1 | 2/2005 | Cameron |
| 2005/0044571 | A1 | 2/2005 | Goldman |
| 2005/0172231 | A1 | 8/2005 | Blacketter |
| 2006/0015893 | A1 | 1/2006 | Kitsukawa |
| 2007/0107030 | A1 | 5/2007 | Zigmond |

FOREIGN PATENT DOCUMENTS

| | | |
|---|---|---|
| EP | 0942595 | 9/1999 |
| GB | 2338364 | 12/1999 |
| WO | 97-022207 | 6/1997 |
| WO | 98-017064 | 4/1998 |
| WO | 98-041020 | 9/1998 |
| WO | 98-053611 | 11/1998 |
| WO | 01-001270 | 1/2001 |

OTHER PUBLICATIONS

U.S. Appl. No. 10/133,554, filed Apr. 26, 2002, Zigmond.
Electronic Industries Association EIA-746A, "Transport of Internet Uniform Resource Locator (URL) Information using Text-2 (T-2) Service" (Sep. 1998).
"Uniform Resource Locators for Television Broadcasts," D. Zigmond, (Jun. 1997).
"Uniform Resource Locators for Television and Telephony," D. Zigmond, (Oct. 1996).
R. Panabaker, S. Wegerif, and D. Zigmond, "The Transmission of IP Over the Vertical Blanking Interval of a Television Signal," (Feb. 1999).
"Creating Interactive Television Links," http://developer.webtv.net/itv/links/main.htm (Jun. 9, 1999).
"Displaying Television Broadcasts in Web Pages," http://developer.erbtv.net/itv/embedtv.main.htm (Jun. 9, 1999).
Electronic Industries Association EIA-608, "Recommended Practice for Line 21 Data Service" (Sep. 1994).
Request for Comments (RFC) 791, "Internet Protocol, DARPA Internet Protocol Specification," Sep. 1981.
Bryant, Stewart Dr., "The Liberate Technologies TV Navigator for DTV: A Think Web-Centric Client For Digital Television".
Electronic Industries Association EIA - 516, "Joint EIA/CVCC Recommended Practice for Teletext: North American Basic Teletext Specification (NABTS)", 89 pages (May 1988).
Advanced Television Enhancement Forum Specification (ATVEF), comment draft Version 1.0, Revision 1, 19 pages (Aug. 1998).
Advanced Television Enhancement Forum Specification (ATVEF), Draft Version 1.1, Revision 19, 32 pages (Aug. 1998).
Prestion Galla, "How The Internet Works", Special Edition, pp. 66, 67, 142, 143, 150, 152, 260, 261, 278, 279 (1997).
Intel Intercast Website, "How Does It Work", Pages from www.intercast.com, 8 pages (Jan. 29, 1999).
J. Daniel Gifford, "Teletext Decoder", Radio-Electronics, Apr. 1996, pp. 45-49.

S. Deering, "Host Extensions for IP Multicasting" (Aug. 1989).
J. Postel, "User Datagram Protocol," (Aug. 1980), identified as page "ftp://ftp.isi.edu/in-notes/rfc768.txt".
ECMA - European Association for Standardizing Information and Communication systems, "Standard ECMA - 262, 2nd Edition" (Aug. 1998).
W3C, "Document Object Model (DOM) Level 1 Specification" (Oct. 1998), Identified as page http://www.w3.org/TR/1998/REC-DOM-Level-1-19981001/DOM.txt.
W3c, "HTML 4.0 Specification," Chapters 1-18 (Apr. 1998), Identified as page http://www.w3.org/TR/REC-html40/.
"Netcentives Launches Global Incentive Program," Netcentives Press (download Oct. 25, 1999) Identified as pages "htpp://www.netcentives.com/press/archive/NC19991021a.html".
"ClickReward™, It all adds up," Netcentives Press (Download Oct. 25, 1999) Identified as page "http.www.netcentives.com/clickrewards/index.html".
Michael B Jones, "The Microsoft Interactive TV System: An Experience Report", p. 17 (Jul. 1997).
Office Action dated Mar. 29, 2004 cited in Patent No. 7,174,562.
Office Action dated Jul. 8, 2004 cited in Patent No. 7,174,562.
Office Action dated Apr. 20, 2005 cited in Patent No. 7,174,562.
Office Action dated Aug. 12, 2005 cited in Patent No. 7,174,562.
Office Action dated Jan. 31, 2006 cited in Patent No. 7,174,562.
Office Action dated Jul. 30, 2006 cited in Patent No. 7,174,562.
Notice of Allowance dated Oct. 10, 2006 cited in Patent No. 7,174,562.
Office Action dated Dec. 19, 2002 cited in U.S. Appl. No. 09/345,247.
Notice of Allowance dated Jun. 4, 2003 cited in U.S. Appl. No. 09/345,247.
Office Action dated Jul. 5, 2002 cited in U.S. Appl. No. 09/295,436.
Notice of Allowance dated Jan. 15, 2003 cited in U.S. Appl. No. 09/295,436.
Office Action dated Dec. 6, 2000 cited in U.S. Appl. No. 09/295,746.
Office Action dated Jul. 18, 2001 cited in U.S. Appl. No. 09/295,746.
Notice of Allowance dated May 21, 2002 cited in U.S. Appl. No. 09/295,746.
Office Action dated May 9, 2001 cited in U.S. Appl. No. 09/087,354.
Office Action dated Jan. 31, 2002 cited in U.S. Appl. No. 09/087,354.
Office Action dated Dec. 17, 2002 cited in U.S. Appl. No. 09/087,354.
Office Action dated Jun. 19, 2003 cited in U.S. Appl. No. 09/087,354.
Office Action dated Dec. 8, 2003 cited in U.S. Appl. No. 09/087,354.
Office Action dated May 5, 2004 cited in U.S. Appl. No. 09/087,354.
Notice of Allowance dated Jul. 13, 2004 cited in U.S. Appl. No. 09/087,354.
Supplemental Notice of Allowability dated Mar. 10, 2005 cited in U.S. Appl. No. 09/087,354.
Office Action dated Apr. 12, 2000 cited in U.S. Appl. No. 09/099,481.
Notice of Allowance dated Sep. 11, 2000 cited in U.S. Appl. No. 09/099,481.
Supplemental Notice of Allowability dated Nov. 9, 2000 cited in U.S. Appl. No. 09/099,481.
Office Action dated Feb. 13, 2004 cited in U.S. Appl. No. 09/788,985.
Office Action dated Nov. 17, 2004 cited in U.S. Appl. No. 09/788,985.
Notice of Allowance dated Jun. 17, 2005 cited in U.S. Appl. No. 09/788,985.
Notice of Allowance dated Oct. 31, 2006 cited in U.S. Appl. No. 11/216,250.
Office Action dated May 9, 2003 cited in U.S. Appl. No. 09/345,223.
Office Action dated Nov. 21, 2003 cited in U.S. Appl. No. 09/345,223.
Office Action dated Jun. 3, 2004 cited in U.S. Appl. No. 09/345,223.
Office Action dated Oct. 20, 2005 cited in U.S. Appl. No. 09/345,223.
Notice of Allowance dated Jun. 14, 2006 cited in U.S. Appl. No. 09/345,223.
Office Action dated Aug. 14, 2002 cited in U.S. Appl. No. 09/287,985.
Office Action dated Apr. 21, 2003 cited in U.S. Appl. No. 09/287,985.
Office Action dated Sep. 25, 2003 cited in U.S. Appl. No. 09/287,985.

Office Action dated Mar. 29, 2004 cited in U.S. Appl. No. 09/287,985.
Notice of Allowance dated Mar. 2, 2005 cited in U.S. Appl. No. 09/287,985.
Office Action dated Apr. 10, 2003 cited in U.S. Appl. No. 09/566,695.
Notice of Allowance dated Mar. 1, 2004 cited in U.S. Appl. No. 09/566,695.
Office Action dated Oct. 27, 2003 cited in U.S. Appl. No. 09/566,695.
Office Action dated Oct. 22, 2007 cited in U.S. Appl. No. 10/835,196.
Office Action dated Jul. 9, 2008 cited in U.S. Appl. No. 10/835,196.
Office Action dated Dec. 24, 2008 cited in U.S. Appl. No. 10/835,196.
Office Action dated Dec. 30, 2008 cited in U.S. Appl. No. 11/614,759.
Office Action dated Nov. 22, 2000 cited in U.S. Appl. No. 09/412,839.
Office Action dated Jul. 18, 2001 cited in U.S. Appl. No. 09/412,839.
Notice of Allowance dated Feb. 25, 2002 cited in U.S. Appl. No. 09/412,839.
Office Action dated Oct. 16, 2007 cited in U.S. Appl. No. 10/918,864.
Office Action dated May 13, 2008 cited in U.S. Appl. No. 10/918,864.
Office Action dated Jan. 21, 2009 cited in U.S. Appl. No. 10/918,864.
"WebTV Networks Introduces It's Revolutionary Next-Generation System-Web TV Plus", on Network Computing News, Sep. 16, 1997, Downloaded from www.ncns.com Jul. 3, 2008.
"WebTV Plus . . . Is it Worth an Upgrade?" by Dexter Davenport on Net4tv, Apr. 1, 1998, Downloaded form www.net-4tv.com, Jul. 3, 2008.
Office Action dated Aug. 5, 2008 cited in U.S. Appl. No. 11/093,666.
Office Action dated Feb. 4, 2009 cited in U.S. Appl. No. 11/093,666.

* cited by examiner

CONNECTED-CONTENT TRIGGER 200

< http://www.webtv.net/dir/page.html> [conn:true] [expires:19991031] [checksum]
_____/ _____/ _____/ _____/
              205                       210              215            220
                                       222↖    ↗225

DISCONNECTED-CONTENT TRIGGER 230

< c:\windows\webtv\temp\programs> [conn:false][checksum]
_____/ _____/ _____/
              205                      210        220
                                      222↖  ↗225

PROVIDING MULTIPLE LEVELS OF INTERACTIVE TELEVISION SERVICE USING TRIGGERS AND TRIGGER FILTERS

CROSS-REFERENCE TO RELATED APPLICATIONS

The present application is a continuation application of commonly-assigned U.S. patent application Ser. No. 09/467,851 filed Dec. 20, 1999, entitled "Providing Multiple Levels of Interactive Television Service Using Triggers and Trigger Filters", which is incorporated herein by reference.

BACKGROUND OF THE INVENTION

Background and Related Art

FIG. 1 depicts a conventional interactive television system 100, including a broadcast television transmitter 105, a broadcast antenna 110, and a pair of receiver units 115 and 120. Receiver units 115 and 120, also referred to as "Internet terminals" or "set-top boxes," allow viewers to interact with network content via bi-directional (i.e., two-way) connections 122 and 123, watch broadcast television via a unidirectional (i.e., one-way) broadcast connection between antenna 110 and the receiver units, or simultaneously do both.

Receiver units 115 and 120 merge network and broadcast experiences, displaying icons, data, and other information along with broadcast video. Much of the displayed information is interactive, which is to say that the viewer can interact with the information to obtain a personalized experience. For example, an icon broadcast with a TV commercial can provide a link to additional information about an advertised product or service.

Broadcasters present viewers with interactive information by broadcasting a "trigger" 126 along with television video 130. Trigger 126 may include the interactive information and/or may provide a link to additional information resources. A link to additional information might include the pathname of a local file on receivers 115 and 120 or a Uniform Resource Identifier (URI) for an Internet resource, such as a sponsor's Web site.

Web pages and other information resources that require a bi-directional connection to a remote information store are termed "connected content." Locally stored information resources that can be accessed without a bi-directional connection to a remote information store are termed "disconnected content." A locally stored electronic programming guide stored in local memory is an example of disconnected content. Disconnected content may include links to connected content.

A trigger identifying connected content typically causes receiver units 115 and 120 to display an icon offering a viewer the option of purchasing an advertised item by selecting the icon and filling out an order form. In the example of FIG. 1, trigger 126 has caused receiver units 115 and 120 to display an icon 135 that provides a hyperlink to an order form 145 on a remote information store 150. If a viewer selects icon 135 using e.g. a handheld remote control unit 140, then the viewer's receiver unit requests and receives order form 145. The viewer can then interact with order form 145 to submit user-specific information back to a merchant's server.

A trigger identifying disconnected content may also cause receiver units 115 and 120 to display an icon, but the information associated with the icon will be accessible without a bi-directional connection to remote information stores. For example, such a trigger might refer to an electronic programming guide stored in local memory on receiver units 115 and 120. Disconnected content can be delivered to receiver units 115 and 120 in a number of ways; for example, the viewer may load the content into local memory, or the content may be encoded into a broadcast television signal and transmitted to receiver units 115 and 120 for local storage.

Vendors who lease or sell receiver units provide their customers access to remote information stores, typically for a fixed monthly fee. These vendors in turn buy bandwidth from network equipment companies that supply the necessary hardware to connect receiver units to remote information stores. In a typical agreement between a receiver-unit vendor and a network equipment company, the costs to the vendor depend upon whether and how long their customers connect to remote information stores. Furthermore, the time during which a customer connects to a remote information store affects the charges accrued by service suppliers, peak-usage periods typically costing more per unit time than do periods of lower activity. Thus, the connection costs incurred by receiver-unit vendors depend upon whether and when their customers connect to remote information stores.

Receiver-unit vendors would like to offer different levels of service at different prices, so that customers who connect to remote information stores pay for the additional costs associated with connecting. By making customers who connect to remote information stores pay for connection costs, receiver-unit vendors (and others who support interactive television) can offer a lower level of interactive television service for cost-sensitive customers who do not want to pay to connect to remote information stores.

BRIEF SUMMARY OF THE INVENTION

The present invention employs a system of broadcast triggers in which connectivity values identify associated information resources as either "connected content" or "disconnected content." The term "connected content" refers to information resources, such as Web pages, that are accessed via bi-directional connections to remote information stores; the term "disconnected content" refers to information resources, such as a locally stored program guide, that do not require such a bi-directional connection.

In accordance with an embodiment of the invention, receiver units that are temporarily or permanently incapable of establishing bi-directional connections to remote information stores ("disconnected receivers") can identify and reject triggers that direct the viewer to connected content (i.e., connected-content triggers) by examining the connectivity values of incoming triggers. Thus, content providers can broadcast connected-content triggers to connected and disconnected receiver units without interrupting disconnected receiver units with triggers they cannot execute. Furthermore, the ability to distinguish between connected-content triggers and disconnected-content triggers allows service providers to offer a lower level of service to those users who do not wish to pay for the ability to establish a bi-directional connection to remote information stores.

In accordance with another embodiment of the invention, service suppliers can offer a semi-connected level of service to customers who opt for limited access to remote information stores. For example, such users may agree to be barred access to connected content during peak hours, or for more than a certain number of hours per month.

Disconnected receiver units include a trigger filter that can distinguish between disconnected-content triggers and connected-content triggers. Disconnected receiver units filter out connected-content, and so do not interrupt the respective viewers with links to inaccessible content. Filters in receiver units adapted to provide the semi-connected level of service recognize a third type of trigger that can be executed at a later time, allowing customers of this level of service to take advantage of less expensive off-peak rates offered by network equipment companies.

Other features of the present invention will be apparent from the accompanying drawings and from the detailed description that follows.

DETAILED DESCRIPTION OF THE PREFERRED EMBODIMENTS

Figure 1:
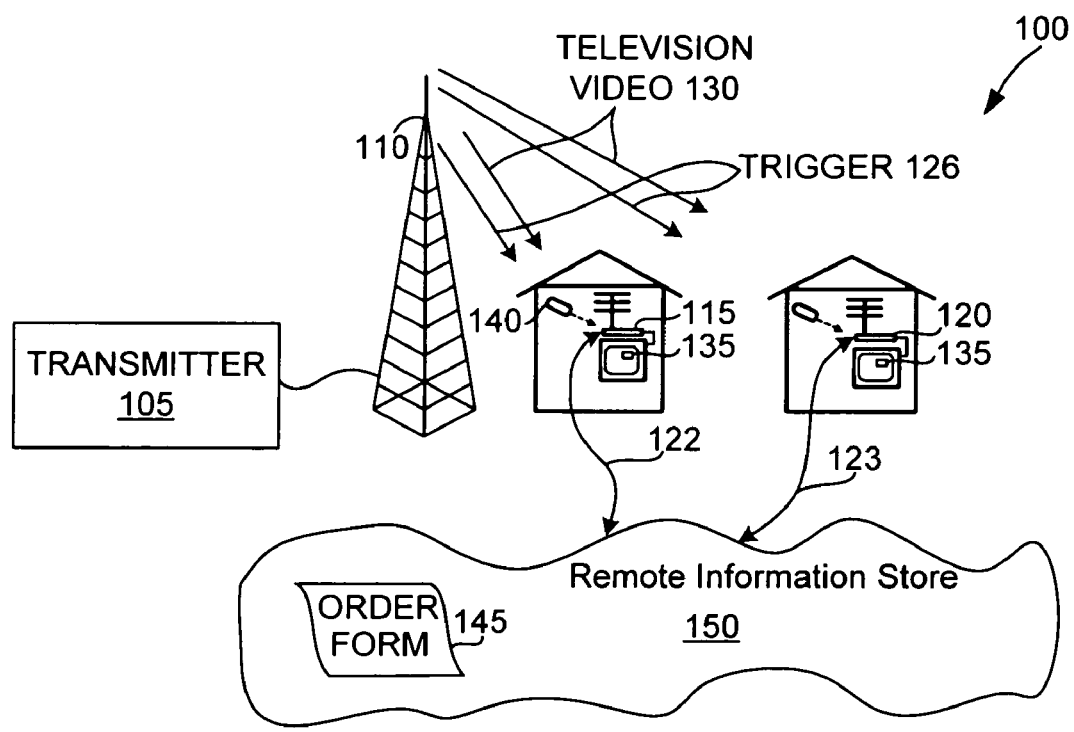
FIG. 1 (Prior Art) is a diagram of an interactive television system 100.

The present invention enables vendors who lease or sell receiver units to offer different levels of service to receiver-unit customers. One level of service allows customers to exchange information with remote information stores. For example, this level of service might allow customers to establish dial-up or cable connections to dedicated servers, or to Web servers via the Internet. Broadcasters can send these customers links, in the form of broadcast "triggers," to Web servers that provide the customer with additional information relating to a broadcast program or commercial. Customers can then select such links to access the additional information. Selecting a link establishes a bi-directional connection to the resource indicated by the link. In accordance with one embodiment of the invention, information resources, such as Web pages, that require a bi-directional connection from a receiver unit are termed "connected content."

Some customers are either unable or unwilling to access connected content. These customers may be uncomfortable with the idea of exchanging information with remote sites or may simply be unwilling to pay for the requisite connectivity. The present invention supports such customers by allowing receiver-unit vendors to supply "disconnected" receiver units that do not support the ability to access connected content. Disconnected receiver units provide access to interactive information, but this information is limited to information that is transmitted in a broadcast video channel, stored locally in the receiver unit, or both. Such information, termed "disconnected content," typically includes electronic program guides, electronic newspapers, or program reminders.

Disconnected receiver units in accordance with the invention include a trigger filter that distinguishes between triggers that direct the viewer or receiver unit to connected content (i.e., connected-content triggers) and triggers that direct the viewer or receiver unit to disconnected content (i.e., disconnected-content triggers). Disconnected receiver units filter out connected-content triggers, and so do not interrupt the respective viewers with links to inaccessible content.

Connected- and disconnected-content triggers can be transmitted in the vertical-blanking interval (VBI) of an analog broadcast video signal. The text service channels of line 21 of the VBI provide a robust communication medium, albeit at relatively low bandwidth. In some embodiments of the invention, triggers are text based, and their syntax follows a basic format that complies with the Electronic Industries Association EIA-746A, "Transport of Internet Uniform Resource Locator (URL) Information Using Text-2 (T-2) Service" (September 1998), which is incorporated herein by reference. EIA-746A defines the formatting necessary to transmit Internet URLs using the vertical-blanking interval of a broadcast television signal, and is incorporated herein by reference. For further details regarding acceptable trigger syntax, see the Advanced Television Enhancement Forum Specification (ATVEF), Versions 1.1 revision 26, (Feb. 2, 1999), which is incorporated herein by reference.

In one embodiment that complies with EIA-746A, each trigger includes a uniform resource identifier (URI) followed by zero or more fields and an optional checksum. Each field, in turn, includes an attribute/value pair. The following illustrates typical trigger format:

<uri>[attr$_1$:val$_1$][attr$_2$:val$_2$] . . . [attr$_n$:val$_n$][checksum]

Figures 2, 3:
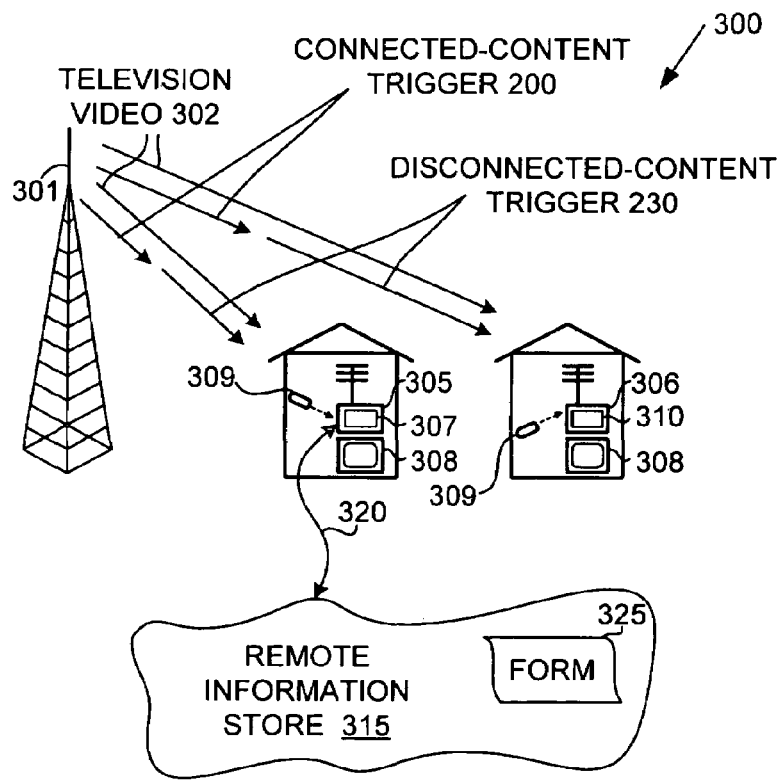
FIG. 2 is a simplified diagram of a pair of triggers that include connectivity attributes.
FIG. 3 is a simplified diagram of an interactive television system 300 in accordance with one embodiment of the present invention.

FIG. 2 depicts an exemplary connected-content trigger 200 and an exemplary disconnected-content trigger 230. Trigger 200 includes a URI field 205, a connectivity field 210, an "expires" field 215, and a checksum 220.

In connected content trigger 200, URI field 205 identifies a Web page presenting additional information about a product, service, or event related to a broadcast television program or commercial. The same field 205 in disconnected content trigger 230 identifies a resource local to receiver units configured to receive and understand trigger 230.

Connectivity field 210, identified by a connectivity attribute 222, includes a connectivity value 225 indicating whether URI 205 addresses connected content. In connected-content trigger 200, a connectivity value of "true" indicates that URI 205 addresses connected content; in disconnected-content trigger 230, a connectivity value of "false" indicates that the associated URI 205 addresses disconnected content. Connectivity value 225 may be set to "true" even if URI 205 is directed to disconnected content that includes links to connected content. For example, a connected-content trigger may call up a form in local memory (disconnected content) that, once filled out, requires a connection for submission. Thus, URI 205 is directed to a local resource, but the author of the trigger might nevertheless label set value 225 to "true" to avoid interrupting viewers with a form they cannot use.

The "expires" field 215 is optional, and can be used to provide a time stamp indicating a time at which trigger 200 expires. One embodiment employs the form yyyymmddThhmmss, where the capital letter "T" separates the date from the time. The time string may be shortened by reducing the resolution. For example yyyymmddThhmm (no seconds specified) is valid, as is yyyymmdd (no time specified at all). When no time is specified, the trigger expires at the beginning of the specified day. The "expires" attribute can be abbreviated as the single letter "e" (e.g., [e:19991031] causes trigger 200 to expire on Oct. 31, 1999). The "expires" field 215 ensures that information contained in triggers is timely. Without this attribute, a rebroadcast of a show might provide a "stale" link that is no longer directed to a valid information resource.

Checksum 220 can be appended to the end of trigger 200 to detect data corruption that may occur during receipt or transmission of a trigger. One embodiment employs a two-byte hexadecimal checksum produced by the standard TCP/IP checksum algorithm described in Request For Comments (RFC) 719, "Internet Protocol," September 1981, which is incorporated herein by reference.

FIG. 3 is a simplified diagram of an interactive television system 300 in accordance with one embodiment of the invention. System 300 includes a broadcast antenna 301 broadcasting television video 302 and respective connected-content and disconnected-content triggers 200 and 230. System 300 also includes a first television receiver unit 305 and a second television receiver unit 306. Receiver units 305 and 306 provide customers access to interactive content using an ordinary TV set 308 as a display and a remote control 309 or wireless keyboard (not shown) for user input. Receiver units 305 and 306 include respective trigger filters 307 and 310. As discussed below in detail, trigger filters 307 and 310 can be configured to accept or reject connected-content triggers.

Receiver unit 305, a "connected" receiver unit, can establish and maintain a connection 320 to a remote information store 315. Receiver unit 306, a "disconnected" receiver unit, is not configured to connect to remote information store 315. Remote information store 315 is, in one embodiment, a server controlled by a television sponsor, and includes a digital form 325 adapted to query prospective buyers who access information store 315 via connection 320. Connection 320 may be any suitable bi-directional connection, including a POTS (plain old telephone service), Integrated Services Digital Network (ISDN), T1, fiber optic link, cable modem, or satellite.

In one embodiment, receiver units 305 and 306 are WebTV® set-top Internet Terminals similar to those described in the following documents, but modified to support features of the invention:

1. U.S. patent application Ser. No. 09/099,118, entitled "Communicating Logic Addresses Of Resources In A Data Service Channel Of A Video Signal," filed Jun. 17, 1998, by Daniel J. Zigmond, et al.;
2. U.S. patent application Ser. No. 09/295,746, entitled "Enabling and/or Disabling Selected Types Of Broadcast Triggers," filed Apr. 20, 1999, by Timothy F. Park, et al.; and
3. U.S. patent application Ser. No. 09/295,436, entitled "Receiving An Information Resource From The Internet If It Is Not Received From A Broadcast Channel," filed Apr. 20, 1999, by Daniel J. Zigmond, et al.

The content of these documents is incorporated herein by reference. Receiver units 305 and 306 may be other types of receiver units, such as a personal computer having a television tuner card such as the "Windows® 98 Broadcast PC" system.

Figure 4:
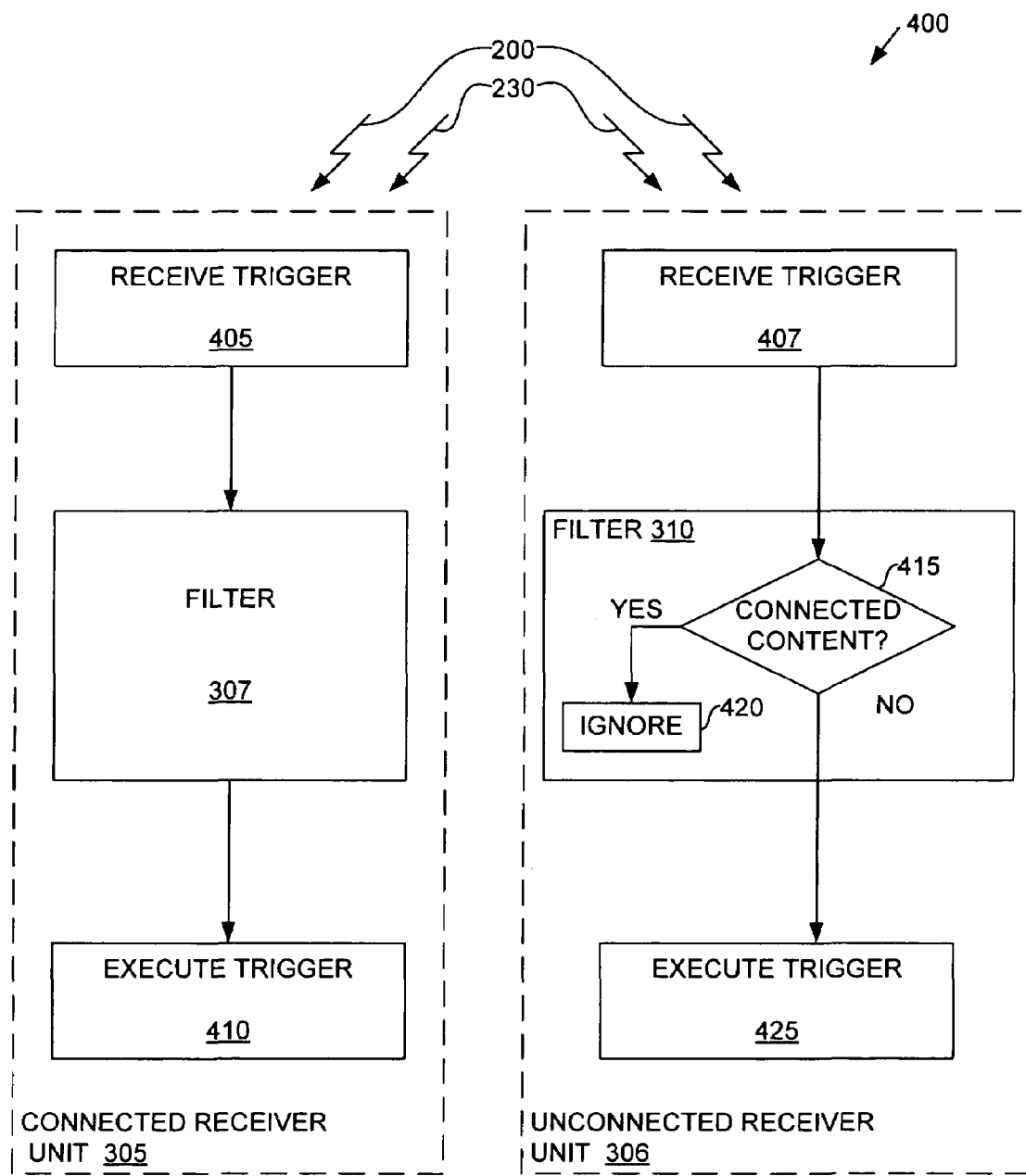
FIG. 4 is a flowchart depicting methods carried out by system 300 of FIG. 3.

FIG. 4 is a flowchart 400 illustrating receiver methods of receiver units 305 and 306. Each of receiver units 305 and 306 receives connected-content trigger 200 of FIG. 2 (steps 405 and 407). Connected receiver unit 305 subjects trigger 200 to filter 307, which is configured to accept connected-content triggers. Thus, filter 307 forwards connected-content trigger 200 for execution in step 410. In the example of FIG. 3, executing trigger 200 causes an icon (not shown) to be displayed on display 308 of receiver unit 305. If the viewer selects the icon using e.g. handheld remote control unit 309, then receiver unit 305 retrieves form 325 from remote information store 315 and presents form 325 to the viewer. The viewer may then use form 325 to provide personalized information to the entity that maintains information store 315. In a typical example, a viewer fills in form 325 to request additional information about a product or service presented to the viewer during a television advertisement.

Returning to FIG. 4, disconnected receiver unit 306 subjects trigger 200 to filter 310, which is configured to reject connected-content triggers. That is, filter 310 checks connectivity value 225 of connectivity field 210 (both of FIG. 2) and determines that value 225 is "true," indicating that trigger 200 is associated with connected content. Filter 310 therefore rejects trigger 200 in a decision depicted as step 415. In rejecting trigger 200, receiver unit 306 simply ignores trigger 200 (step 420) and awaits a subsequent trigger.

Next, receiver 305 and 306 receive disconnected-content trigger 230, in which connectivity value 225 is "false." This value indicates that trigger 230 is associated with content that is to be made available disconnected receiver units. Thus, filter 310 passes trigger 230 (step 415). Disconnected receiver unit 306 then executes trigger 230 (step 425), which is to say that receiver unit 306 carries out some instruction expressed by trigger 230. For example, receiver unit 306 might display an icon presenting a link a program guide, or some other local resource. Filter 307 also passes disconnected-content triggers, so connected receiver unit 305 also executes disconnected-content trigger 230.

For a more detailed treatment of triggers and trigger filters, see co-pending application Ser. No. 09/295,746 entitled "Enabling and/or Disabling Selected Types of Broadcast Triggers," by Timothy F. Park, Dean J. Blackketter, and Sandra R. Bernardi, the contents of which is incorporated herein.

Vendors of receiver units typically provide customers access to remote information stores for a fixed monthly fee. Vendors, in turn, buy bandwidth from network equipment companies that supply the necessary hardware to connect receiver units to remote information stores. In a typical agreement between a vendor and a network equipment company, the costs to the vendor depend upon the time during which customers connect, peak-usage periods typically costing more per unit time than periods of lower activity. Thus, the connection costs incurred by vendors depend upon whether and when their customers connect to remote information stores.

One embodiment of the invention allows vendors to offer receiver-unit customers a level of service that allows access to connected content only during specified times, such as during periods of relatively low activity. In accordance with this embodiment, some receiver units are configured to ignore connected-content triggers during specified time periods, or to store connected-content triggers for execution at a later time. For example, a viewer might execute a link to connected a content that provides additional information about an advertised product or service. The viewer's receiver unit might then store the link for execution at a later time.

Figure 5:
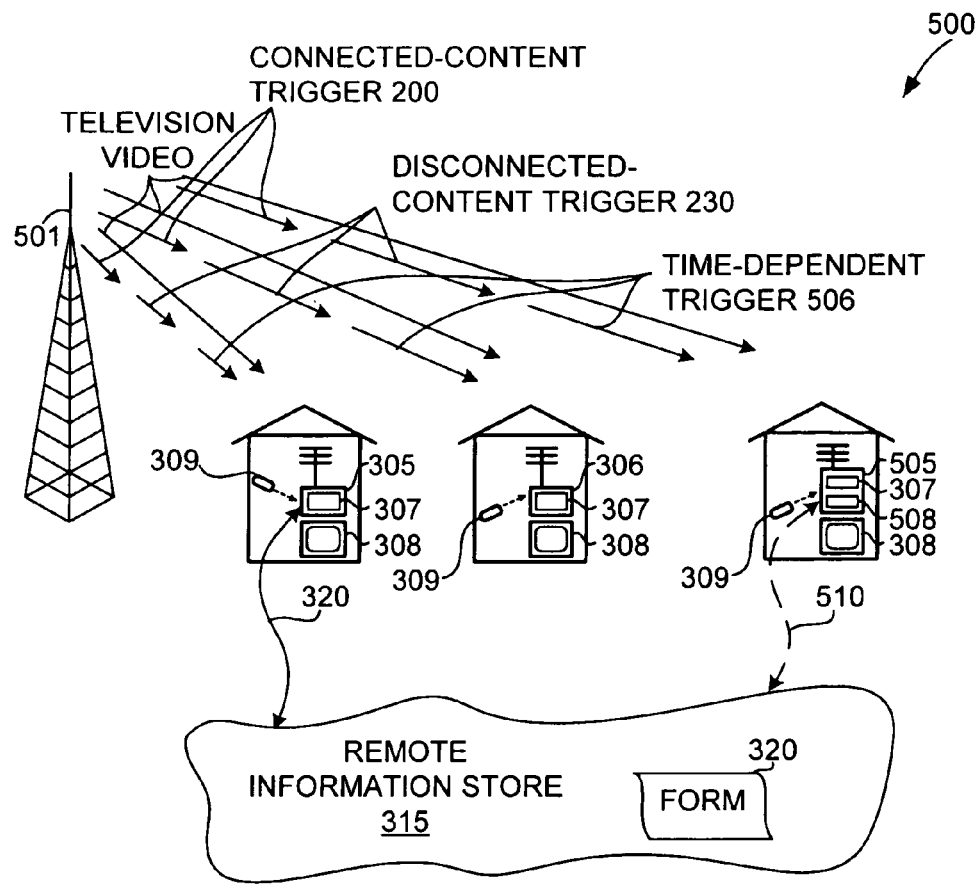
FIG. 5 is a simplified diagram of an interactive television system in accordance with an embodiment of the present invention.

FIG. 5 is a simplified diagram of an interactive television system 500 in accordance with an embodiment of the invention that allows vendors to offer receiver-unit customers what might be called a "semi-connected" level of service. System 500 includes many of the components discussed above in connection with FIG. 3, like-numbered elements being similar. System 500 additionally includes a semi-connected receiver unit 505 that acts as a connected-content receiver at times determined by connectivity information stored in a local memory 508. During those times, receiver unit 505 can establish or maintain a bi-directional connection 510 to remote information store 315. At other times, receiver unit 505 acts like disconnected receiver unit 306 of FIGS. 4 and 5. Thus, the configuration data in local memory 508 allows receiver unit 505 to access connected content only during proscribed periods. Alternatively, receiver unit 505 might filter out connected-content triggers during proscribed periods and nevertheless allow the viewer to access connected content, as desired, during those periods.

Some types of connected content may not make sense if retrieved later. For example, an enhancement to a broadcast television show may be "stale" if presented during a subsequent program. Other types of connected content are better suited for delayed execution. For example, a television commercial may offer a connected-content link to additional information about an advertised product, such as the current price. Selecting the link may prompt the sponsor to send the viewer additional information via e-mail, conventional mail, or telephone. In such a case, the viewer need not establish a connection right away to obtain the desired response from the sponsor. It might therefore make sense accept viewer requests and send them in later when a connection is established.

Figure 6:
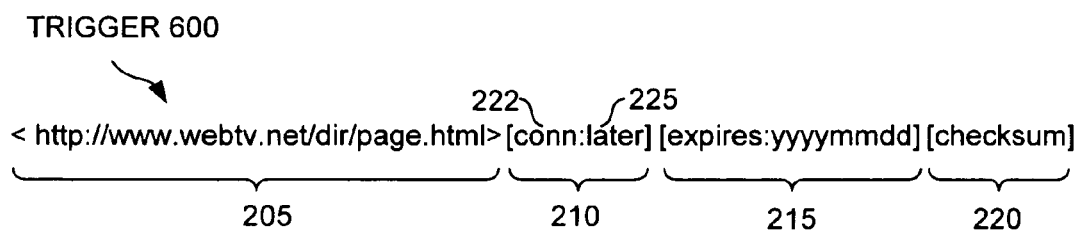
FIG. 6 is an example of a trigger.

FIG. 6 depicts a trigger 600 in accordance with an embodiment of the invention that supports connectivity attributes that identify triggers that may be executed at a later time. Trigger 600 is similar to triggers 200 and 230 of FIG. 2, like-numbered features being the same. Trigger 600 is different, however, in that connectivity value 225 is set to "later," indicating that trigger 600 refers to connected content that is suitable for future access.

Trigger 600 can be executed immediately by connected receiver units, but can also be executed later by semi-connected receiver units. For example, a semi-connected receiver unit may store trigger 600, or some portion thereof, for later execution. The semi-connected receiver unit then executes each trigger in local memory when a connection is established at some later time. The later time might be a time of day, the end of a random or specified period from receipt of the trigger, or the next time the viewer initiates a connection.

Receiver units 305, 306, and 505 may be hard-wired to function as connected, disconnected, or semi-connected receiver units. Alternatively, their respective functionality can be defined by configuration data stored in local memory (e.g., memory 508). This alternative allows vendors to preset and/or remotely modify receiver units to establish a desired level of service. In other embodiments, the customer can select between connected, disconnected, and semi-connected receiver configurations. The customer may therefore decide whether he or she wishes to be, notified of connected content. Local memory can be any physical medium that stores configuration data associated with the level of connectivity, including a RAM, hard and floppy disks, CD-ROM, DVD, and flash ROM.

Connectivity field 210 (FIGS. 2 and 6) can support additional connectivity values. For example, the presence of field 210 can indicate that the associated trigger refers to connected content, and the absence of field 210 can indicate that a trigger refers to disconnected content. In other embodiments, connectivity value 225 can be can be assigned a variable indicating the likelihood that the associated trigger will require access to connected content. Such variable can be numbers that range from zero (zero percent likelihood of involving a connection to a remote information store) to one hundred (a one hundred percent likelihood of involving a connection to a remote information store). Receiver units can then determine whether to execute a given trigger based on the likelihood that the trigger involves a connection. This embodiment may be used when a trigger identifies a number of resources, only some of which are directed to connected content.

In another embodiment, disconnected receiver units reject triggers to connected content not by ignoring them, but instead provide the viewer with an indication that a displayed link cannot be executed. Disconnected receiver units may, for example, provide a message indicating that selecting a displayed icon will have no effect.

In yet another embodiment, connected content and disconnected content are defined as set forth in the U.S. patent application Ser. No. 09/345,247, entitled "Interactive Television Triggers Having Connected Content/Disconnected Content Attribute," by Leak et al., which is incorporated herein by reference.

Although the present invention is described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. In an interactive system that includes a receiver having customizable configuration information specifying whether the receiver is connected or disconnected, wherein the receiver can receive both connected content that can be accessed when the receiver is connected and disconnected content that can be accessed when the receiver is disconnected, a method for preventing a viewer from being interrupted by links to inaccessible enhanced content when the receiver is disconnected, the method comprising:

storing configuration information specifying whether a receiver is connected to, or disconnected from, a bi-directional connection to a remote source, wherein the configuration information can be customized to control when the receiver will execute a connected-content trigger that links to connected content and when the receiver will execute a disconnected-content trigger that links to disconnected content, the connected content comprising enhanced content that is accessed by the receiver when the receiver is in a connected state and the disconnected content comprising enhanced content that is accessed by the receiver when the receiver is in a disconnected state, and wherein the receiver will only execute a connected-content trigger and thereby access the connected content when the configuration information specifies that the receiver is connected;

receiving a content trigger linking to enhanced content, wherein the content trigger includes a plurality of fields, the plurality of fields including at least a location field referencing a location of the enhanced content, and a separate connectivity field indicating whether the enhanced content is connected content or disconnected content;

determining, based on a connectivity value within the connectivity field within the content trigger, whether the content trigger is a connected content trigger or a disconnected-content trigger; and upon determining that the connectivity value distinguishes the trigger as a connected-content trigger, and upon waiting a prescribed period of time and until the configuration information indicates that the receiver is connected, executing the connected-content trigger to thereby access the enhanced content from a remote source over the bi-directional connection to the remote source.

2. The method of claim 1 further comprising:

upon determining that the connectivity value distinguishes the trigger as a disconnected-content trigger, regardless of whether the configuration information indicates that the receiver is connected or disconnected, executing the disconnected-content trigger, wherein the disconnected-content trigger identifies enhanced content that is accessed from local storage without the bi-directional connection to the remote source.

3. The method of claim 1, wherein executing a connected-content trigger comprises displaying information associated with the connected-content trigger.

4. The method of claim 1, further comprising:
modifying the configuration information from specifying that the receiver is disconnected to specifying that the receiver is connected.

5. The method of claim 4, wherein the configuration information is remotely modified by a third party.

6. The method of claim 4, wherein the configuration information is modified by a user of the receiver.

7. The method of claim 1, wherein the connected-content trigger is received by the receiver when the configuration information specifies that the receiver is disconnected, and wherein the receiver stores the connected-content trigger at least until the configuration information specifies that the receiver is connected.

8. The method of claim 1, further comprising:
modifying the configuration information to change the receiver from being connected to disconnected.

9. The method of claim 8, wherein the configuration information is remotely modified by a third party.

10. The method of claim 8, wherein the configuration information is modified by a user of the receiver.

11. The method of claim 1, wherein the configuration information is stored in a local memory of the receiver.

12. The method of claim 1 further comprising preventing a display of information associated with the connected-content trigger during the prescribed period of time.

13. The method of claim 1 wherein the plurality of fields further includes a field that defines the prescribed period of time.

14. The method of claim 1, wherein the interactive system comprises an interactive television system.

15. The method of claim 1, wherein the interactive system comprises a personal computer having a television tuner card.

16. A receiver having customizable configuration information specifying whether the receiver is connected or disconnected, wherein the receiver can receive both connected content that can be accessed when the receiver is connected and disconnected content that can be accessed when the receiver is disconnected, and wherein the receiver prevents a viewer from being interrupted by links to inaccessible enhanced content when the receiver is disconnected, the receiver comprising:
means for storing configuration information specifying whether a receiver is connected to, or disconnected from, a bi-directional connection to a remote source, wherein the connection information can be customized to control when the receiver will execute a connected-content trigger that links to connected content and when the receiver will execute a disconnected-content trigger that links to disconnected content, the connected content comprising enhanced content that is accessed by the receiver when the receiver is in a connected state and the disconnected content comprising enhanced content that is accessed by the receiver when the receiver is in a disconnected state, and wherein the receiver will only execute a connected-content trigger and thereby access the connected content when the configuration information specifies that the receiver is connected;
means for receiving a content trigger linking to enhanced content, wherein the content trigger includes a plurality of fields, the plurality of fields including at least a location field referencing a location of the enhanced content, and a connectivity field indicating whether the enhanced content is connected content or disconnected content;
means for determining, based on a connectivity value within the connectivity field in the content trigger, whether the content trigger is a connected content trigger or a disconnected-content trigger; and
means for, upon determining that the connectivity value distinguishes the trigger as a connected-content trigger, and upon waiting a prescribed period of time and until the configuration information indicates that the receiver is connected, executing the connected-content trigger to thereby access the enhanced content from a remote source over the bi-directional connection to the remote source.

17. The receiver of claim 16 further comprising:
means for, upon determining that the connectivity value distinguishes the trigger as a disconnected-content trigger, regardless of whether the configuration information indicates that the receiver is connected or disconnected, executing the disconnected-content trigger, wherein the disconnected-content trigger identifies enhanced content that is accessed from local storage without the bi-directional connection to the remote source.

18. The receiver of claim 16 further comprising means for modifying the configuration information.

19. The receiver of claim 16 wherein means for determining that the connectivity value distinguishes the trigger as a connected-content trigger further comprises means for identifying one or more triggers that can only be executed at a time other than the prescribed period of time.

20. The receiver of claim 16, wherein the receiver is incorporated within a personal computer that also has a television tuner card.

* * * * *